Feb. 13, 1968     W. F. MITCHELL     3,368,416
SELF-ADJUSTING PULLEY
Filed July 30, 1965                                  3 Sheets-Sheet 1
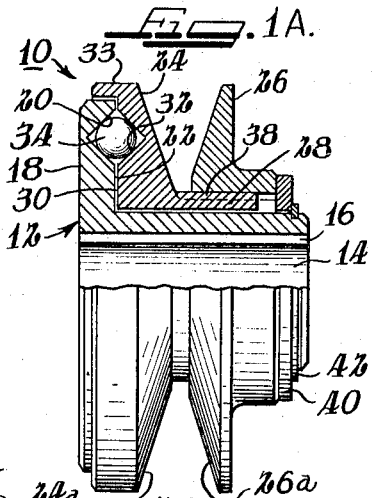
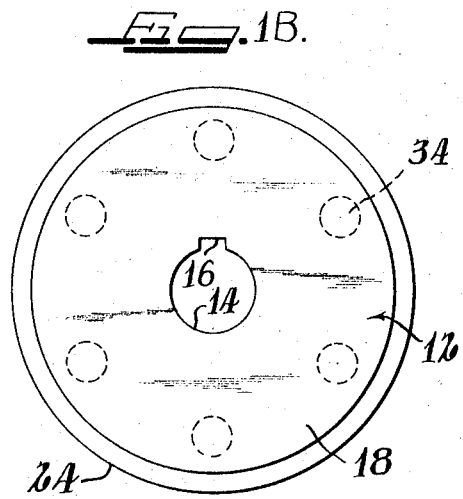
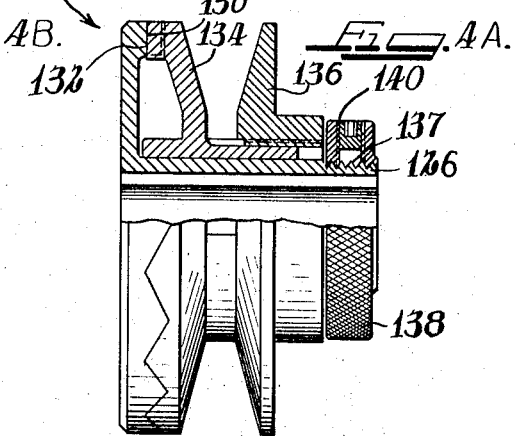
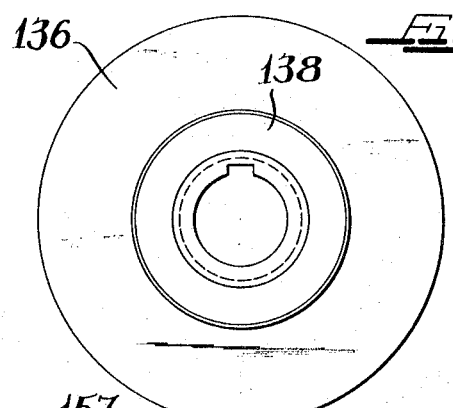
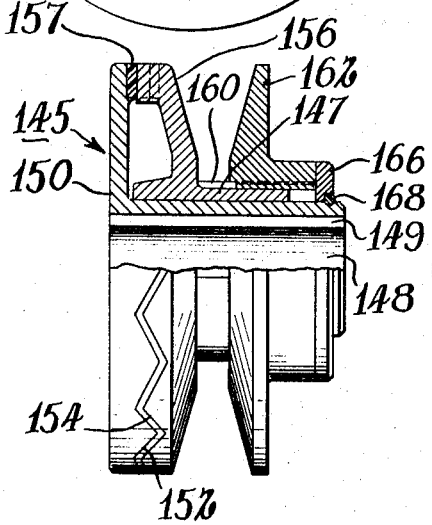
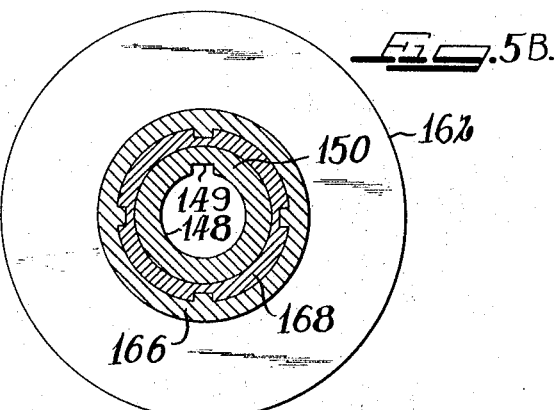
INVENTOR
WALLACE F. MITCHELL
BY
Fidler, Bradley & Patnaude
Attys.

Feb. 13, 1968 W. F. MITCHELL 3,368,416
SELF-ADJUSTING PULLEY
Filed July 30, 1965 3 Sheets-Sheet 2
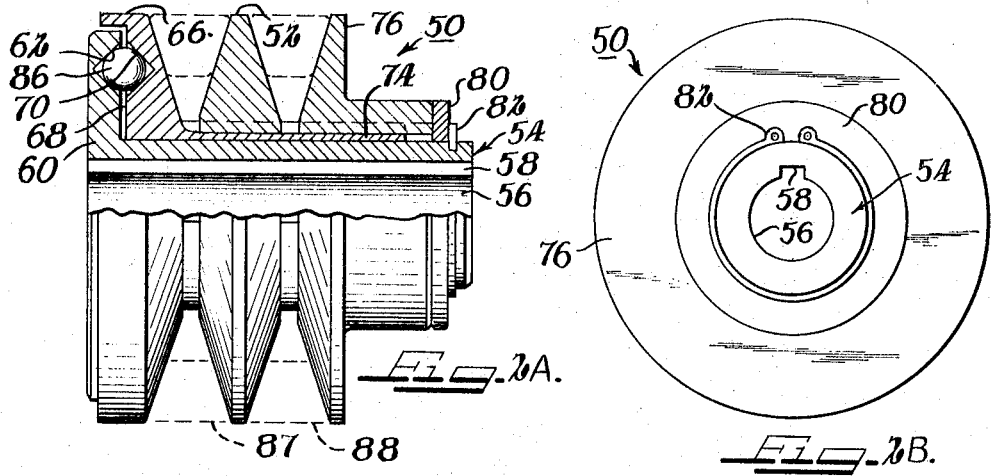
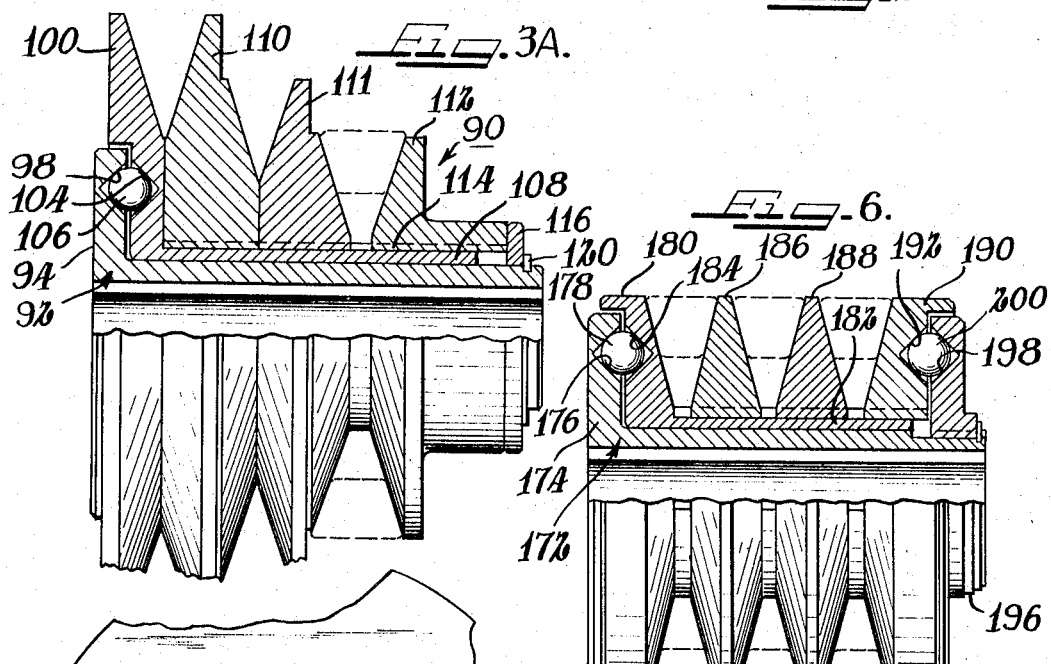
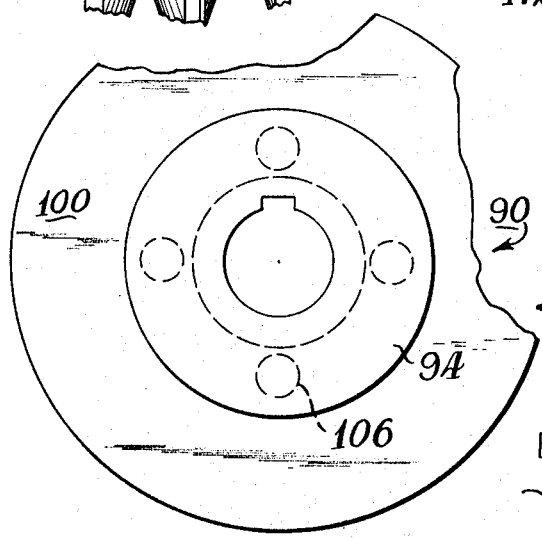
INVENTOR
WALLACE F. MITCHELL
BY
Fidler, Bradley & Strande
Attys.

Feb. 13, 1968  W. F. MITCHELL  3,368,416
SELF-ADJUSTING PULLEY
Filed July 30, 1965  3 Sheets-Sheet 3

INVENTOR
WALLACE F. MITCHELL
BY Fidler, Bradley & Patnaude
Attys.

United States Patent Office 3,368,416
Patented Feb. 13, 1968

3,368,416
SELF-ADJUSTING PULLEY
Wallace F. Mitchell, 916 W. Campbell St.,
Arlington Heights, Ill. 60005
Filed July 30, 1965, Ser. No. 476,103
16 Claims. (Cl. 74—230.17)

ABSTRACT OF THE DISCLOSURE

A self-tensioning pulley includes a plurality of sheave parts held in fixed angular relationship by a key which permits relative axial movement therebetween, and a plurality of drive-camming surfaces interposed between the shaft and one of the sheave parts for adjusting the spacing between the sheave parts in proportion to the torque transmitted between the shaft and a belt held by the pulley between the sheave parts.

---

The present invention generally relates to pulleys for use with friction type belts, and it relates more particularly to a pulley having axially adjustable sheave parts and means for drivingly connecting said sheave parts to a rotatable shaft and for automatically adjusting the distance between the sheave parts in relation to the torque exerted on the pulley.

In order to increase belt life and to operate a belt drive system at maximum efficiency, the prior art has recognized the need for a mechanism which would adjust the tension on the belt in response to changes in the load. Accordingly, many attempts have been made in the prior art to provide such a device and one attempted solution has been in the direction of multi-sheave pulleys in which the sheaves are movable with respect to one another to adjust the tension on the associated friction belt. Such prior art devices have generally been complex and, therefore, expensive to manufacture and maintain but, more importantly, they have not operated satisfactorily. These prior art pulleys generally rely upon the centrifugal force exerted on a movable member within the pulley to adjust the spacing between the sheave parts. Consequently, when these pulleys operate as intended, tension on the belt is proportional to the rotational speed of the pulley. However, the object of a self-adjusting pulley is to prevent slippage between the belt and the sheave, and slippage is dependent on the reactive force exerted by the load on the pulley through the belt. Accordingly, it would be desirable to provide a self-adjusting pulley which is responsive to the torque transmitted through the pulley to the belt and which is substantially unresponsive to the angular velocity of the pulley.

Therefore, a principal object of the present invention is to provide a new and improved self-adjusting pulley.

Another object of the present invention is to provide a pulley which automatically adjusts the tension on an associated friction belt in relation to the torque transmitted from the pulley to the belt.

A further object of the present invention is to provide a new and improved self-adjusting pulley which is quiet in operation.

A still further object of the present invention is to provide a self-adjusting pulley which includes a relatively small number of parts and which is compatible with quantity production manufacturing techniques.

Briefly, the above and further objects are realized in accordance with one embodiment of the present invention by providing a self-adjusting pulley including a pair of sheave parts which are keyed together for relative axial movement and which are rotatable relative to an associated shaft and connected thereto solely by means of a driving-camming mechanism. The driving-camming connection thus provides the sole driving connection between the sheaves and the shaft and automatically adjusts the spacing between the sheaves in accordance with the torque transmitted by the pulley to the associated friction belt.

Further objects and advantages and a better understanding of the present invention may be had by reference to the following detailed description taken in connection with the accompanying drawings wherein:

FIGURE 1A is a partly-sectioned view of a pulley embodying the present invention;

FIGURE 1B is an elevational view taken of the left-hand face of the pulley of FIG. 1A as shown in the drawings;

FIGURE 2A is a partially sectioned view of a multiple sheave pulley embodying the present invention;

FIGURE 2B is an elevational view of the right-hand face of the pulley of FIG. 2A as shown in the drawings;

FIGURE 3A is a partly-sectioned view of a step-cone pulley embodying the present invention;

FIGURE 3B is an elevational view taken from the left-hand side of FIG. 3A;

FIGURE 4A is a partly-sectioned view of a pulley embodying the present invention;

FIGURE 4B is an elevational view taken from the right-hand side of the pulley of FIG. 4A as shown in the drawings;

FIGURE 5A is a partly-sectioned view of a pulley embodying the present invention;

FIGURE 5B is a sectional view taken along the line 5B—5B in FIG. 5A;

FIGURE 6 is partly-sectioned view of another pulley embodying the present invention employing two sets of driving-camming members;

Figure 7A:
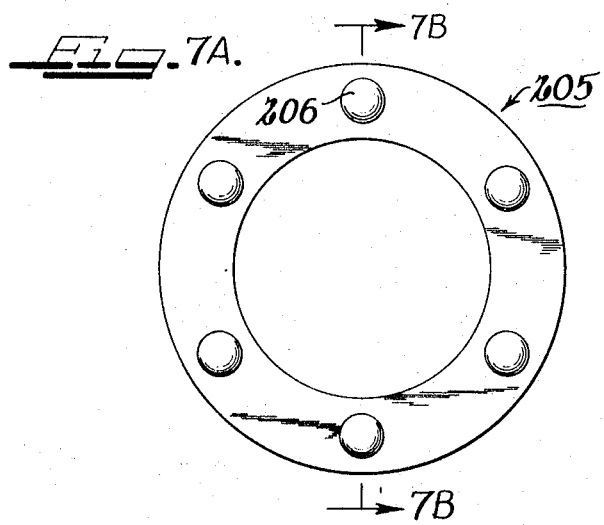
FIGURE 7A is a view of a ring type camming member in accordance with another feature of the present invention.

Referring now to the drawings and particularly to FIG. 1A and 1B thereof, there is shown a self-adjusting pulley 10 constructed in accordance with the teachings of the present invention and which comprises a hub member 12 formed of metal or other suitable material and having an axial bore 14 extending therethrough for receiving a rotatable drive or driven shaft. A longitudinal slot 16 extends axially along one side of the bore 14 to provide a keyway for securing the pulley on the associated shaft and for locking the same against relative rotation.

The hub member 12 includes an integral, radially extending flange portion 18 having a plurality of symmetrically arranged conical recesses 20 provided in the radially extending face or planar surface 22. In the preferred embodiment of the invention shown in FIG. 1A, the flange 18 is an integral part of the hub member 12, but it will be understood by those skilled in the art that a separate flange member could be provided and fixedly secured to the hub or to the shaft if desired.

In order to frictionally engage a friction type V-belt, there is provided a pair of sheave parts 24 and 26, which have generally conical opposing belt engaging faces 24a and 26a so that as the sheave parts are moved together the tension on an associated belt is increased, and when the sheave parts are moved apart, the tension on the associated belt is decreased. Considered in greater detail, the sheave part 24 includes a tubular hub portion 28 which loosely extends over the hub member 12 to permit relative rotation and relative axial movement between the sheave part 28 and the hub member 12. The sheave part 24 has a radially extending planar surface 30 which faces the corresponding surface 22 on the flange 18 and which is provided with a plurality of conical recesses 32 which are equal in number and location to the recesses 20. An annular flange portion 33 on the sheave part 24 overlies the marginal edge of the flange 18 to protect the camming-driving mechanism.

In order to drivingly connect the hub member 12 to the sheave part 24, a plurality of spherical balls 34 are respectively mounted in the recesses 20 and 32 and have a diameter such that with the recesses 20 and 32 relatively aligned, the balls 34 maintain the radial surfaces 22 and 30 a small distance apart. Although the balls 34 may be made of any suitably strong material such as metal, in order to minimize noise and to permit the manufacture of the pulley to relatively wide dimensional tolerances, it is preferred that the balls 34 be made of a somewhat resilient or elastomeric material. Hard rubber may thus be used, and it has also been found that several plastic materials such as nylon, styrene, and Teflon may also be used. By using resilient camming-driving members or balls 34, a driving connection between all of the balls and the associated parts will be achieved even though the respective parts are not dimensionally accurate.

The sheave part 26 is keyed on the hub portion 28 of the sheave part 24 by means of an axial key 36 which is received in complementary keyways 38 in the hub portions of the sheave parts 24 and 26.

The sheave parts 24 and 26 are held in assembled relationship on the hub member 12 by means of a washer 40 which overlies the end surface of the sheave part 26 and which is in turn held in place by means of a resilient snap-ring 42 which fits in an annular groove 44 near the end of the hub member 12.

In use, the pulleys 10 is preferably keyed to a drive shaft which may be directly connected to the armature of an electric motor. A suitable friction type V-belt, not shown in the drawings, is connected between the pulley 10 and a simple pulley having a pair of fixed sheaves which is keyed to the shaft of a load to be rotated. The belt length is selected so that when the drive shaft is at rest the belt is under slight tension.

When the system is started in operation and a driving torque is exerted on the drive shaft, the hub member 12 is rotated because of the fact that it is keyed to the shaft and thereby exerts a torque through the balls 34 to the sheave part 24 and in turn to the sheave part 26 which is keyed thereto. If there is no substantial load on the belt, there will be little angular displacement between the hub 12 and the sheave part 24 and, therefore, there will be little axial displacement between the parts. Where, however, the load exerts a greater reactive force on the belt, the sheaves 24 and 26 are refrained from movement with the hub 12 whereby the grooves 20 and 32 rotate out of alignment until the force exerted from the hub 12 to the sheave part 24 by the balls 34 is equal to the reactive force exerted through the belt to the sheave parts 24 and 26. This results in a corresponding axial movement of the sheave parts 24 away from the flange 18 and thus toward the sheave part 26 thereby increasing the tension on the belt. Consequently, the belt is tensioned by an amount proportional to the torque which is transmitted to it by the pulley. Since the mass of the balls 34 is relatively small, the effect of centrifugal force on the adjustment between the sheave parts is nil. As more particularly described hereinafter in connection with FIGS. 4–8, it will be seen that the effect of centrifugal force can be entirely eliminated without affecting the operation of the pulley.

Referring now to FIGS. 2A and 2B, there is shown a multiple sheave pulley 50 for use in a multiple V-belt drive system. The pulley 50 is closely similar in construction and operation to the pulley 10 of FIGS. 1A and 1B, but includes a center sheave 52 which is keyed to the other two sheave parts but is freely slidable in an axial direction relative thereto so that equal forces are exerted on the respective belts driven by the pulley 50.

Considered in greater detail, the pulley 50 comprises a hub member 54 having an axial bore 56 therein and a keyway 58 extending longitudinally of the bore. A transversely extending flange 60 is provided on the hub member 54 and has a plurality of conical recesses symmetrically arranged in a radially extending surface 64. A first sheave part 66 is rotatably mounted on the hub 54 and has a radially extending planar surface 68 which faces the surface 64 on the flange 60. The surface 68 is provided with a plurality of conical recesses 70 which correspond in location to the recesses 62. A longitudinal key 72 is positioned in keyways on the hub portion 74 of the sheave part 66 to slidably receive the sheave part 52 having a correspondingly provided keyway slot and for also slidably receiving a sheave part 76 which likewise has a correspondingly disposed keyway slot 78 for receiving the key 72. The sheave parts 52 and 76 are slidably fitted to the key 72 so as to be axially movable therealong relative to the sheave part 66 during operation of the pulley.

In order to maintain the separate sheave parts 52, 66, and 76 in assembled relationship on the hub member 54, a washer 80 is disposed over the hub 54 at the right-hand end of the sheave part 76 as viewed in FIG. 2A and a resilient snap ring 82 is positioned in an annular groove 84 near the end of the hub 54, thereby holding the washer 80 in place which in turn maintains the sheave parts in assembled relationship and also holds a plurality of drive balls 86 which may be like the balls 34 of the pulley 10 in place between the sheave part 66 and the hub 54.

The pulley 50 operates to automatically adjust the tension on a plurality of belts 87 and 88 which are driven thereby in the same manner as the pulley 10 automatically operates to adjust the tension on the associated V-belt. In the case of the pulley 50, however, the additional sheave part 52 slides between the two belts 86 and 88 to equalize the transverse forces which are exerted thereon as the sheave part 66 is moved toward the sheave part 76.

Referring to FIGS. 3A and 3B, there is shown a multiple sheave step-cone pulley 90 embodying the automatic tensioning feature of the present invention. The pulley 90 is also similar in operation and structure to the self-adjusting pulley 10 shown in FIGS. 1A and 1B, and includes a hub member 92 having an axial bore 94 and an associated keyway slot 96 which extends therethrough. The hub 92 has a transverse flange portion 94 extending therefrom to provide a radially extending surface 96 in which is provided a plurality of conical grooves 98 symmetrically arranged about the longitudinal axis of the bore 94. A first sheave part 100 is rotatably and slidably mounted over the hubs 92 and includes a radially directed face portion 102 facing the surface 96 and provided with a plurality of conical recesses 104 oriented with and disposed opposite to the recesses 98 whereby a plurality of driving-cam balls 106 are respectively positioned in the space defined by oppositely disposed recesses 98 and 104.

The sheave part 100 has an elongated tubular hub portion 108 and a plurality of sheave members 110, 111, and 112, and are slidably and non-rotatably secured thereto by means of a key 114. A stop washer 116 is disposed over the hub 92 near the right-hand end thereof and is held in place by means of a resilient snap ring 118 snugly fitted in an annular slot 120 in the hub 92.

Referring now to FIGS. 4A and 4B, there is shown a self-adjusting pulley 125 embodying the present invention and including adjustment means for enabling the use of the pulley in fixed center installations. As there shown, the pulley 125 includes a hub member 126 having a radially extending flange 128 which is provided with a serrated surface 130 matching a serrated surface 132 on a sheave part 134 which is otherwise freely rotatable and axially slidable on the hub member 126. A second sheave part 136 is keyed to the sheave part 134 so as to be relatively non-rotatable therewith but axially movable with respect thereto. As shown, the sheave parts 134 and 136 have generally conical, opposing, belt engaging surfaces.

In order to permit adjustment of the axial position of the sheave part 136 along the associated shaft extending through the hub 126, the right-hand end of the hub member 126, as shown in FIG. 4A, is provided with an external thread 137 and an adjusting collar 138 having a knurled external surface is threadedly secured thereon. A conventional set screw 140 received in a threaded diametric hole in the collar 138 is provided for locking the collar 138 in the adjusted position on the hub 126.

The mating driving and camming surfaces 130 and 132 on the hub member 126 and the sheave part 134 should be provided with substantially frictionless mating surfaces and to that end the respective surfaces are preferably coated with a low friction material such, for example, as Teflon. In the alternative, a washer formed of Teflon or other suitable material having a complementary serrated surface may be positioned between the surfaces 130 and 132.

In operation, the pulley 125 functions to automatically tension the associated belt in relation to the torque applied between the hub or driving member 126 and the sheave part 134 in the same manner as does the pulley 10. Relative rotation between the camming-driving surfaces 130 and 132 causes the sheave part 134 to move axially along the hub 126 and since the sheave part 136 occupies a relatively fixed position because of the collar 138, increased tensioning of the associated belt results. It will be clear to those skilled in the art that adjustment of the position of the sheave part 134 is independent of centrifugal force or the speed of rotation of the pulley 125.

Referring to FIGS. 5A and 5B, there is shown another self-adjusting pulley 145 embodying the present invention and including a hub or driving member 146 having an axial bore 148 and associated longitudinally extending keyway 149 provided therein. The hub 146 has a tubular portion 147 and a radially extending flange 150 having a cam surface in the nature of a generally serrated surface 152 complementary to a correspondingly shaped surface 154 on a sheave part 156. A washer 157 having complementary shaped serrated surfaces and formed of a low friction material such as Teflon is interposed between the camming-driving surfaces 152, 154. The sheave 156 is provided with a hub portion 158 which is rotatable and slidable on the hub 146 and which is connected by means of a key 160 to a sheave part 162 which is provided with a keyway slot 164 and is therefore axially slidable but non-rotatably connected to the sheave part 156. A washer 166 and associated snap ring 168 provide a stop to hold the assembly together.

The pulley 145, like the pulley 125, uses interengaging camming surfaces on the flange 150 and the sheave part 156 and, therefore, it is important that the friction between the two parts be minimized. To this end, the respective surfaces may be coated with a suitable low friction material such, for example, as Teflon or the washer 157 having low friction surfaces may be disposed between the two parts.

Referring to FIG. 6, there is shown a multiple V-drive pulley 175 embodying the present invention. The pulley 175 operates on the same principle as the other pulleys heretofore described, but has two driving-camming mechanisms which operate from the respective ends thereof. The pulley 175 includes a hub or driving member 172 having a radial drive flange 174 provided thereon with a plurality of symmetrically arranged conical recesses 176 for receiving respective ones of a plurality of driving-camming balls 178. A sheave part 180 having a relatively long tubular hub portion 182 is rotatable and slidable on the hub 172 and is provided with a plurality of conical recesses 184 which correspond in location to the recesses 176 for receiving the balls 178. Keyed to and slidably mounted on the hub portion 182 of the sheave part 180 is a pair of sheave parts 186 and 188. In this embodiment of the invention, the adjustment of the tension on the belt is carried out from both ends of the pulley and, therefore, a sheave part 190 is keyed to the hub 182 of the sheave part 180 and is provided with a plurality of conical recesses 192 in the radially extending face thereof. A second camming flange 194 is keyed to the hub member 172 and held at a fixed axial position thereon by means of a snap ring 196 received in a suitable annular groove in the hub 172. The drive plate or flange 194 is provided with a plurality of conical recesses 198 corresponding in location to the recesses 192 and a plurality of driving-camming balls 200 are respectively disposed in the spaces provided by oppositely positioned recesses 192 and 198.

In operation, the pulley 175 carries out the self-adjusting feature by virtue of the relative movement between the sheave part 180 and the flange 174 and between the sheave part 190 and the plate 194. Where three or more belts are to be driven simultaneously with the same pulley, it is preferable to provide the adjustment from both ends thereof so that uniformity of tension can be achieved.

Figure 7B:
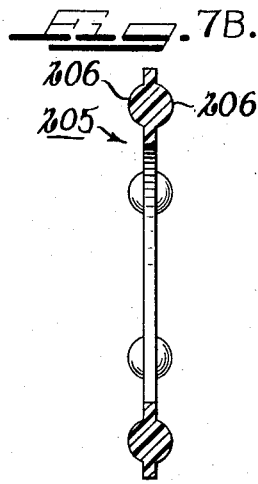
FIGURE 7B is a sectional view taken along the line 7B—7B of FIG. 7A.

In order to facilitate the manufacture of the various pulleys shown in FIGS. 1, 2, 3 and 6, the individual driving-camming balls may be replaced by a single member 205 as shown in FIGS. 7A and 7B. The member 205 is a generally flat washer preferably molded and including a plurality of hemispherical protrusions 206 symmetrically arranged on opposite faces thereof. By using this unitary driving-camming member, not only is the assembly of the pulley facilitated, but also any noise caused by looseness of the individual balls due to manufacturing tolerances is reduced since the individual balls cannot move separately to cause chatter.

Figure 8A:
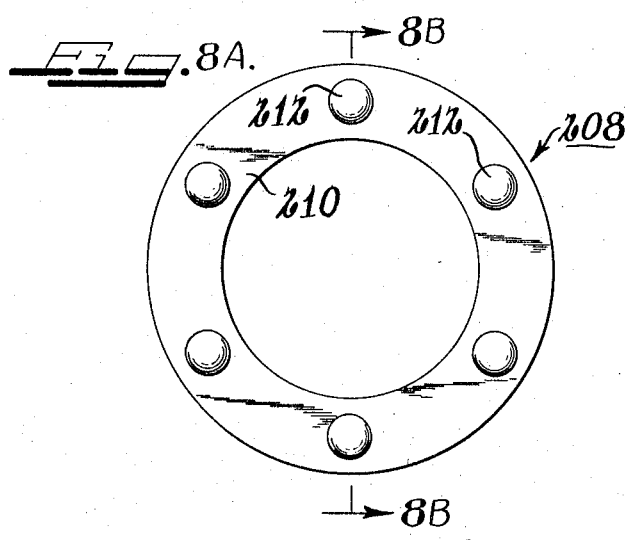
FIGURE 8A is a plan view of another cam ring embodying another feature of the present invention.
Figure 8B:
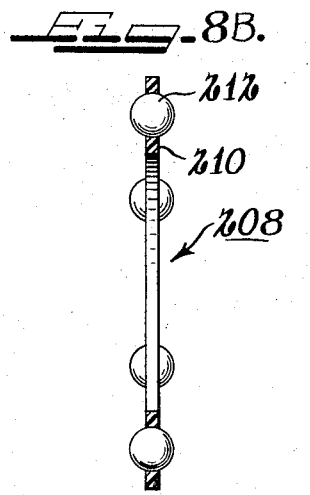
FIGURE 8B is a sectional view taken along the line 8B—8B of FIG. 8A.

In FIGS. 8A and 8B there is shown another driving-camming 208 for facilitating manufacture of the pulley and for further minimizing noise. As there shown, the member 208 includes an annular race 210 in which a plurality of driving-camming balls 212 are rotatably supported. The balls 212 may be made of metal or plastic or rubber or any other suitable material.

Figure 9:
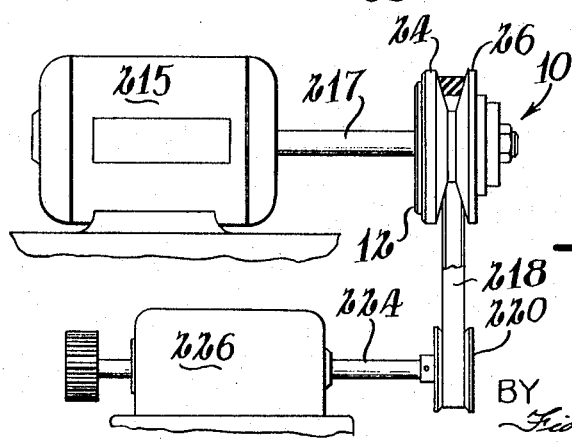
FIGURE 9 is an illustration of a drive system embodying a pulley of the present invention.

Referring to FIG. 9, there is shown a typical application where the self-tensioning pulley of the present invention finds application. As there shown, an electric drive motor 215 is provided with a rotatable output shaft 217 which extends into and is suitably secured to the hub portion 12 of the pulley 10. A conventional friction V-belt 218 is connected between the pulley 10 and a simple fixed sheave pulley 220 which is disposed and locked in place on a shaft 224 of a load member 226.

When the motor 215 is de-energized and the output shaft 217 is at a standstill, the belt 218 will be relatively loose since if it were tight it would push the sheave part 24 to the left thereby to loosen the tension on the belt 218. When the motor 215 is energized, the hub 12 is rotated and, if there is any load at all on the sheave part 24, it will be rotated relative to the hub 12 and be forced to the right into tighter engagement with the belt 218. Depending on the load 226, the torque transmitted to the belt 218 will vary and the sheave part 24 will occupy a position which is angularly related to the hub member 12 in proportion to such torque. As the torque increases, the sheave part 24 will be held farther out of alignment with the hub 12 thereby enabling the driving-camming members to force the sheave part 24 further to the right thereby to increase the tension on the belt.

In operation, when the motor or driving member 215 is energized, the pulley 10 quickly increases the tension on the belt to promptly initiate operation of the load 226.

While the present invention has been described by particular embodiments thereof, it will be understood that those skilled in the art may make many changes and

What is claimed as new and desired to be secured by Letters Patent of the United States is:

1. A self-adjusting pulley comprising,
   a hub adapted to receive and to be secured to a rotatable shaft,
   a radial flange fixedly connected to said hub and having a radially extending face thereof,
   a first sheave part rotatably and slidably mounted on said hub to permit longitudinal and rotational movement between said sheave part and said hub,
   said sheave part having a radially extending face disposed opposite to said radially extending face on said flange,
   cam means responsive to the relative angular positions of said flange and said sheave part for setting the distance between said faces in accordance with said relative angular positions and for drivingly connecting said flange to said sheave part,
   a second sheave part keyed to said first sheave part to permit longitudinal movement only of said sheave parts relative to one another,
   and stop means secured to said hub for limiting the longitudinal movement of said sheave parts relative to said flange.

2. A self-adjusting pulley as set forth in claim 1 wherein said cam means comprises
   a plurality of drive-camming members, and
   a plurality of recesses in said radially extending faces, said drive-camming members each being disposed partly in a recess in one of said faces and partly in a recess in the other of said faces.

3. A self-adjusting pulley as set forth in claim 2 wherein said drive-camming members are spherical balls.

4. A self-adjusting pulley as set forth in claim 3 wherein said drive-camming members are formed of an elastomeric material.

5. A self-adjusting pulley as set forth in claim 4 wherein said drive-camming members are formed of plastic.

6. A self-adjusting pulley as set forth in claim 2 wherein said drive-camming members are mounted in an annular member to prevent relative movement between said drive-camming members.

7. A self-adjusting pulley as set forth in claim 2 wherein said drive-camming members are integral with and protrude from the surface of an annular member disposed between said faces.

8. A self-tensioning pulley comprising,
   a first member adapted to be secured to a shaft for simultaneous rotation therewith,
   first and second sheave members mounted on said shaft for relative rotation thereon,
   means interconnecting said sheave members to permit relative axial movement thereof and to prevent relative rotation thereof, and
   drive-camming means connecting said first member to said first sheave member for drivingly connecting said first members together and for moving said first sheave member toward or away from said second sheave member in proportion to the torque on said sheave members.

9. A self-tensioning pulley as set forth in claim 8 wherein
   said drive-camming means comprises mutually opposing generally serrated surfaces on said first members.

10. A self-tensioning pulley as set forth in claim 9 wherein
    a low friction washer is disposed between said serrated surfaces.

11. A self-tensioning multiple sheave pulley comprising,
    first and second flanged members adapted to be secured in spaced apart mutual relationship on a shaft for simultaneous rotation therewith,
    a plurality of sheave parts mounted for relative rotation about said shaft between said flanged members,
    means interconnecting said sheave parts to permit relative axial movement thereof and to prevent relative angular movement thereof, and
    drive-camming means connected between said flanged members and the respectively adjacent ones of said sheave parts for axially moving said sheave parts away from said flanged members in proportion to the torque applied to said sheave parts.

12. A belt drive system comprising,
    a drive shaft,
    a driven shaft,
    a first pulley mounted on one of said shafts,
    a second pulley as set forth in claim 8 mounted on the other of said shafts, and
    a friction drive belt drivingly connecting said pulleys, whereby the tension on said belt is dependent on the load on said driven shaft and is substantially independent of the velocity of said other of said shafts.

13. A self-adjusting belt receiving pulley of the type having a plurality of sheave parts mounted on a shaft for relative axial movement on said shaft, the improvement comprising
    means for preventing relative angular movement between said sheave parts, and
    means drivingly connecting both said sheave parts in bi-directional relationship to said shaft and responsive to the torque differential between said sheave parts and said shaft for adjusting the relative axially positions of said sheave parts on said shaft to maintain a substantially constant tension on said belt irrespective of the direction of rotation of said shaft.

14. The invention set forth in claim 13 wherein
    one of said sheave parts includes a generally tubular extension on which the other of said sheave parts is mounted, and said means for preventing relative angular displacement between said sheave parts is disposed between said extension and said other sheave part.

15. The invention set forth in claim 14 wherein said means drivingly connecting said sheave parts to said shaft comprises
    a tubular member over which said extension is mounted for at least limited rotational movement relative thereto,
    whereby said sheave parts are prevented from tilting with respect to said shaft.

16. The invention set forth in claim 15 wherein said sheave parts are interconnected by means of a spline.

References Cited

UNITED STATES PATENTS

| | | | |
|---|---|---|---|
| 2,852,952 | 9/1958 | Wolfram | 74—230.17 |
| 2,994,228 | 8/1961 | Osborne | 74—230.17 |
| 3,034,367 | 5/1962 | Steuer | 74—230.17 |
| 3,279,270 | 10/1966 | Pacak | 74—230.17 |

FOREIGN PATENTS

| | | |
|---|---|---|
| 1,014,705 | 6/1952 | France. |
| 1,112,581 | 9/1955 | France. |
| 1,259,965 | 3/1961 | France. |
| 929,326 | 6/1963 | Great Britain. |

FRED C. MATTERN, Jr., *Primary Examiner.*

DAVID J. WILLIAMOWKSY, *Examiner.*

C. J. HUSAR, *Assistant Examiner.*